United States Patent [19]

Oliver

[11] 4,142,621
[45] Mar. 6, 1979

[54] MOBILE AUGER ELEVATOR WITH A FLANGED AUGER TUBE

[75] Inventor: Norman J. Oliver, Sioux Falls, S. Dak.

[73] Assignee: Sioux Steel Company, Sioux Falls, S. Dak.

[21] Appl. No.: 830,602

[22] Filed: Sep. 6, 1977

Related U.S. Application Data

[63] Continuation of Ser. No. 626,121, Oct. 28, 1975, abandoned.

[51] Int. Cl.² .................................. B65G 71/10
[52] U.S. Cl. .............................. 198/318; 198/666
[58] Field of Search ............... 198/300, 311, 318, 657, 198/860, 861, 666, 667; 138/DIG. 11, 105, 106; 174/68 C, 101; 214/83.32

[56] References Cited

U.S. PATENT DOCUMENTS

| 2,465,145 | 3/1949 | Brainerd | 198/672 |
| 2,528,679 | 11/1950 | Ballard et al. | 198/666 |
| 2,890,865 | 6/1959 | Costa | 198/342 X |
| 3,189,168 | 6/1965 | Coates et al. | 198/667 |
| 3,208,581 | 9/1965 | Mayrath | 198/674 |
| 3,430,757 | 3/1969 | Clendenin | 198/657 |

FOREIGN PATENT DOCUMENTS

| 278069 | 1/1966 | Australia | 198/318 |
| 948702 | 2/1964 | United Kingdom | 198/318 |
| 1379913 | 1/1975 | United Kingdom | 174/68 C |

Primary Examiner—Robert B. Reeves
Assistant Examiner—Douglas D. Watts
Attorney, Agent, or Firm—Allegretti, Newitt, Witcoff & McAndrews

[57] ABSTRACT

The improved flight-type auger elevator disclosed herein is particularly adapted for conveying grain, granular materials and the like up relatively steep, lengthy inclines. The improved auger elevator includes a novel auger tube, spiral flighting disposed for rotation within the auger tube for conveying the grain, granular materials and the like through the auger tube, a hopper disposed adjacent to and in communication with the lower, ground adjacent end of the auger tube, and an undercarriage assembly that supports the auger tube at an angle with respect to the ground and that is utilized to selectively raise and lower the other, upper end of the auger tube with respect to the ground. The auger tube has been provided with stiffening flanges.

9 Claims, 6 Drawing Figures

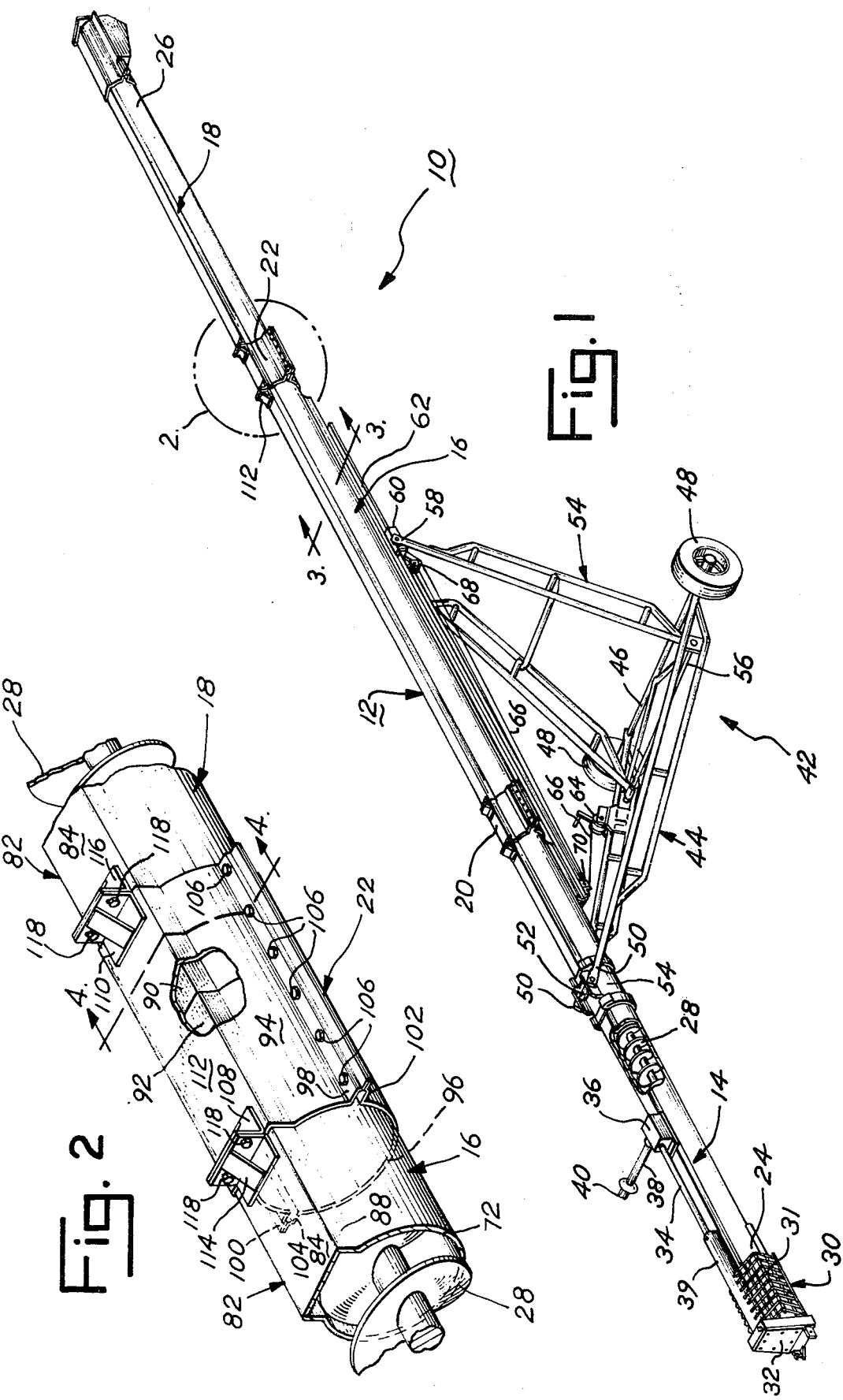

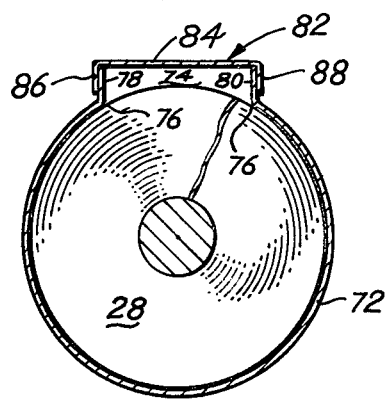
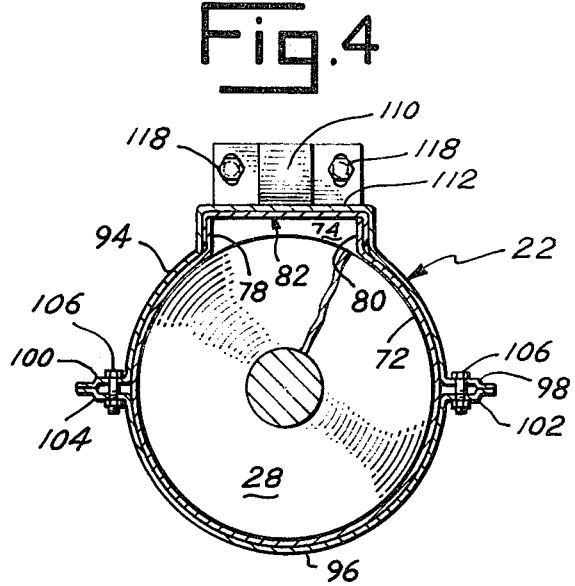
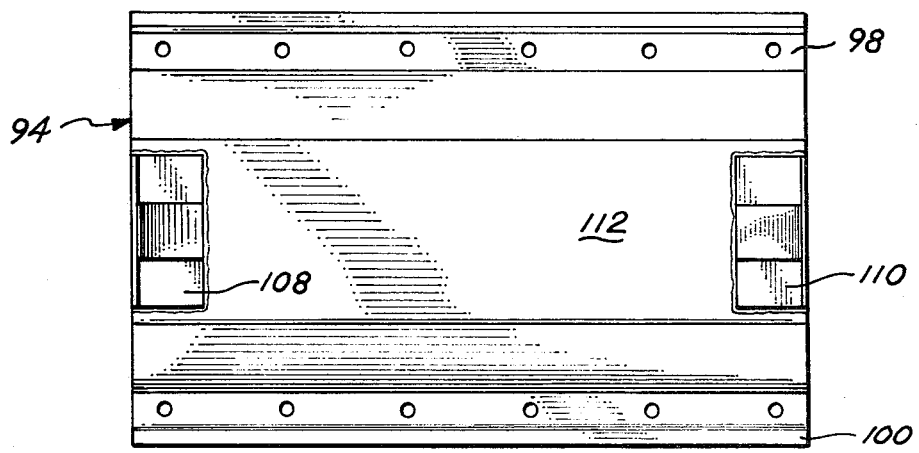
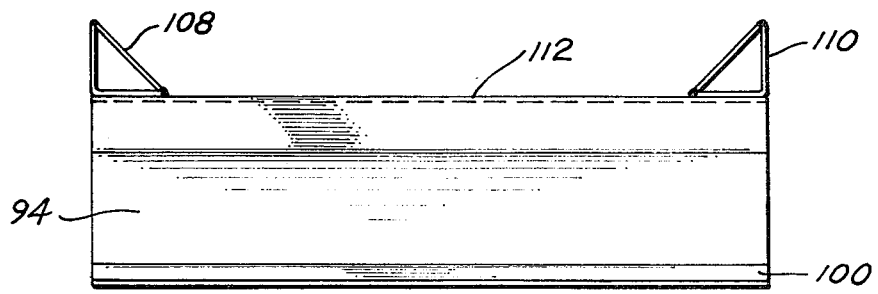

MOBILE AUGER ELEVATOR WITH A FLANGED AUGER TUBE

This is a continuation of application Ser. No. 626,121 filed Oct. 28, 1975, now abandoned.

The novel auger tube has an elongated, cylindrical side body wall that defines a longitudinal flow path, from one end of the auger tube to its other end, for conveying the grain, granular materials and the like. An elongated aperture is formed in the vertically upwardly facing arc portion of the side wall and extends from one end of the auger tube to its other end, with the longitudinal axis of the aperture being parallel to the longitudinal axis of the auger tube. First and second parallel, vertically disposed ribs are mounted adjacent to and along the lateral edges of the elongated aperture for longitudinally strengthening and stiffening the auger tube. A cap covers the aperture and includes an elongated central portion that overlies the aperture and inwardly projecting second and third ribs that are formed on and along the lateral edges of the central portion and that are disposed adjacent to the first and second ribs, respectively, for additionally increasing the longitudinal strength and stiffness of the auger tube.

BACKGROUND AND SCOPE OF THE INVENTION

This invention relates to an improved auger elevator, and more particularly, to an improved auger elevator which includes a novel auger tube having a unique cross-sectional configuration and which is adapted for conveying grain, granular materials and the like up relatively steep, lengthy inclines.

For many years, farmers and others have utilized both stationery and permanent auger elevators to convey or move grain, granular materials and the like from, for example, the ground to the top of the storage bin. These prior auger elevators have all included an elongated cylindrical auger tube. When the prior auger elevators are utilized to convey grain, granular materials and the like up relatively steep, lengthy inclines, cumbersome, relatively heavy external bracing or top-trussing has had to have been used to strengthen and stiffen the cylindrical auger tube. The weight of this external bracing and top-trussing on the upper portion of the auger elevator has often prevented the auger tube from being raised to its optimum angular disposition. In addition, the additional weight of this bracing and top-trussing has made the auger elevator top heavy and difficult to handle.

It is a primary object of my present invention to provide an improved auger elevator which, by the utilization of a novel auger tube, is capable of conveying grain, granular materials and the like up relatively steep, lengthy inclines without the necessity of employing external tube bracing or top-trussing. The elimination of this heretofore required external tube bracing or top-trussing increases the angle through which my improved auger elevator can be raised, decreases the overall weight of my auger elevator and lowers the center of gravity of my auger elevator, as compared to the prior, conventional auger elevators with external tube bracing and top-trussing. This results in greater safety and ease of handling during usage of my improved auger elevator.

More specifically, the auger elevator of the present invention includes a novel auger tube which has spiral flighting disposed therein and which defines a longitudinal flow path for the grain, granular materials and the like being conveyed in my auger elevator. Rotation of spiral flighting moves the grain, granular materials and the like from one end of the auger tube to its other end. A hopper is disposed adjacent to the one end of the novel auger tube for receiving the grain, granular materials and the like to be conveyed and for directing same to the one end of the tube. An undercarriage assembly is used to support the novel auger tube at an angle with respect to the ground and for selectively raising and lowering the other end of the auger tube with respect to the ground.

The novel auger tube includes generally two or three identical elongated tube bodies. Each of these tube bodies has a cylindrical side wall and an elongated aperture which is formed in the vertically, upwardly facing portion of the tube body and which extends from one end of the tube body to its other end. The longitudinal axis of the aperture is parallel to the central longitudinal axis of the tube body. The lateral or side edges of the aperture and the central longitudinal axis of the tube body define an angle of approximately 60° which is bisected by a vertical plane including the central longitudinal axis of the tube body.

First and second vertically disposed, parallel ribs are adjacent to and extend longitudinally along the lateral edges of the aperture for longitudinally strengthening the tube body. An elongated cap covers the aperture so as to prevent the grain, granular materials and the like being conveyed in the tube body from spilling out of or escaping from the tube body through the elongated aperture. The cap includes an elongated central portion that overlies the aperture and third and fourth, parallel, vertically disposed ribs are on and along the lateral edges of the central portion of the cap so that when the cap's central portion overlies the aperture, the third and fourth ribs are positioned adjacent to the first and second ribs, respectively. These four, vertically disposed, parallel ribs form a strong, box-shaped "backbone" for the tube body and provide the tube body with sufficient additional strength and stiffness so that no additional external bracing or top-trussing is required for the tube body even when the novel auger tube exceeds 63 feet in length.

Two or more, usually three, tube bodies that comprise the novel auger tube of my invention are positioned so that their adjacent ends abut and so that their central longitudinal axis are coaxial. Novel tube clamps are used to secure the adjacent, abutting ends of the tube bodies together to prevent relative movement therebetween.

The unique configuration and structure of my novel auger tube affords commercially important advantages other than just significantly increasing the strength and stiffness of the auger tube. In this regard, the inclusion of the box-shaped "backbone" in my novel auger tube provides approximately 5% more cross-sectional area for the conveyance of grain, granular materials and the like, as compared to equivalent, conventional cylindrical auger tubes, tends to minimize the "bunching up" of materials within the tube body and acts as a "safety valve" when such "bunching up" does occur. The inclusion of the box-shaped rib "backbone" also allows accessories to be more easily mounted on the top of my auger tube and permits facile access to the interior of my auger tube without destroying the contour of the tube. The elongated aperture of my auger tube reduces the frictional drag of the wall of the tube body on the materials being moved through the tube body. This lessens the force required to move the materials through the auger tube and reduces grain breakage and cracking.

Furthermore, the novel auger tube of my present invention can be manufactured without the use of any special tube mills. More specifically, my novel auger tube can be formed from flat sheets. This is a significant advantage, from the standpoint of a small manufacturer, since it lessens his dependence on mills which specialize in the manufacture of round tubing.

These and other objects and advantages of my present invention will become apparent from the following description of the preferred embodiment of my invention, described in connection with the accompanying drawings.

DESCRIPTION OF THE DRAWINGS

FIG. 1 is a perspective view of an auger elevator embodying the principles of my present invention.

FIG. 2 is an enlarged view of a tube clamp indicated by line 2 in FIG. 1.

FIG. 3 is a cross-sectional view taken along the line 3—3 in FIG. 1.

FIG. 4 is a cross-sectional view taken along the line 4—4 in FIG. 2.

FIG. 5 is a top plan view of the tube clamp shown in FIG. 2.

FIG. 6 is a side elevational view of the upper portion of the tube clamp shown in FIG. 5.

Throughout the various figures of the drawings, the same reference numerals will be used to designate the same parts. Moreover, when the term "upper", "lower", "right", "left", "right end" and "left end" are used herein, it is to be understood that these terms have reference to the structure shown in the drawings as it would appear to a person viewing the drawings.

DESCRIPTION OF THE PREFERRED EMBODIMENT

Referring now to FIG. 1, an improved auger elevator of the present invention is shown generally at 10. The auger elevator 10 is particularly adapted for conveying or moving grain, granular materials and the like from, for example, ground level to the top of a storage bin or to another storage area located above ground level.

The auger elevator 10 includes a novel auger tube 12 which comprises a lower tube body 14, a middle tube body 16 and an upper tube body 18. These tube bodies 14, 16 and 18 are positioned, end to end, and are aligned so that their central longitudinal axes are coaxial. A novel tube clamp 20 is utilized to secure the adjacent ends of the lower and middle tube bodies 14 and 16 while a second tube clamp 22, substantially identical to the tube clamp 20, is utilized to secure the adjacent ends of the middle and upper tube bodies 16 and 18. The structure of the tube bodies 14, 16 and 18 and the tube clamps 20 and 22 is hereinafter described in more detail.

The interior of the auger tube 12 defines a longitudinal flow path for the grain, granular materials and the like being conveyed by the auger elevator 10. This flow path extends from the lower end 24 of the auger tube 12 to the upper end 26 of the tube 12. Conventional spiral flighting, shown generally at 28, is disposed within the auger tube 12 and extends from the upper end 26 of the auger tube 12 to and beyond the lower end 24 of the tube 12. Rotation of the spiral flighting causes grain, granular materials and the like to be moved up, through the auger tube 12.

A conventional hopper 30 is disposed about the lower projecting end of the spiral flighting 28 and is attached to the lower end 24 of the auger tube 12. The hopper 30 receives the grain, granular material and the like to be conveyed and is utilized to direct these materials to the lower end of the spiral flighting in a conventional manner. A conventional grating 31 overlies the upper end of the hopper 30 to prevent oversized materials from being introduced into the hopper 30.

A conventional, lower end drive train assembly 32 is connected with the lower projecting end of the spiral flighting 28 and is used to rotate the spiral flighting 28 about its longitudinal axis. A drive shaft 34, a gear box assembly 36 and a power take off shaft 38 is utilized to connect the drive train assembly 32 with a suitable source of power, such as a power take off unit. The drive shaft 34 interconnects the assemblies 32 and 36 and is mounted on top of the auger tube 12 so that its longitudinal axis is substantially parallel to the longitudinal axis of the tube 12. A safety shield 39 shrouds the lower portion of the shaft 34. The gear box assembly 36 is mounted on the top of the auger tube 12. The power take off shaft 38 is connected with and projects from the gear box assembly 36 so that its longitudinal axis is substantially perpendicular to the axis of the drive shaft 34. The distal end 40 of the power take off shaft 38 is adapted to be coupled with a power take off unit, not shown.

An undercarriage, shown generally at 42, is used to support the auger tube 12 so that the tube 12 forms an angle with respect to the ground, so that the lower end 24 of the auger tube 12 and the hopper 30 rest on the the ground and so that the upper end 26 of the tube 12 is positioned above the ground. The undercarriage 42 includes a first frame assembly 44 which is constructed of tubular steel members and which has its lower end mounted on a transverse axle 46. Two wheels 48 are mounted for rotation on the opposite ends of the axle 46 and permit the undercarriage 42, and thus the auger elevator 10, to be easily moved from one location to another over the ground. The upper ends 50 of the first frame assembly 44 are pivotably connected to the ends of a stub shaft 52. A bracket 54 is secured to the lower tube body 14 and journals and supports the stub shaft 52.

The undercarriage 42 includes a second frame assembly 54 which, like the first frame assembly 44, is constructed of steel tubular members. The lower end of the second frame assembly 54 is pivotably connected to a transverse bar 56 mounted on the first frame assembly 44. The upper ends 58 of the second frame assembly 54 are pivotably connected to a trolley or bracket member 60. The trolley 60 is adapted to reciprocally slide along a double "L" guide beam 62 secured to the undersurface of the middle tube body 16. The path of travel of the trolley 60 is substantially parallel to the longitudinal axis of the tube body 16.

A conventional, self-locking hand winch 64 is mounted on the first frame assembly 44 and is used for raising and lowering the upper end 26 of the auger tube 12 with respect to the ground. More specifically, one end of a cable 66 is attached to the trolley 60 and the other end is wrapped about the winch 64. Between the trolley 60 and the winch 64, the cable 66 passes over and around at least one pair of pulleys 68 and 70. The pulley 68 is mounted on and carried by the trolley 60 while the pulley 70 is secured to the undersurface of the lower tube body 14 and is spaced from the lower end of the beam 62. This winch, cable and pulley arrangement is of conventional design and, as a result of its usage, when the winch 64 is wound in one direction, the trolley 60 is pulled toward the lower end 24 of the auger tube 12 whereby the upper end 26 of the tube 12 is raised with respect to the ground. Similarly when the winch 64 is rotated in the opposite direction, the trolley 60 is permitted to slide upwardly along the double "L" beam 62 toward the upper ends 26 of the tube 12 whereby the end 26 is lowered with respect to the ground.

As noted above, the auger tube 12 includes three body sections 14, 16 and 18 which are positioned, end to end, so that their longitudinal axis are coaxial and which define the flow path for the grain, granular materials and the like being conveyed by the auger elevator 10. Each of these tube bodies 14, 16 and 18 are structurally and functionally identical, and consequently, only the middle tube body 16 will be described herein in detail.

The tube body 16 includes an elongated, cylindrical side wall 72 which extends from one end of the tube body to the other. The diameter of the side wall 72 is selected so that the flighting 28 may fit closely within the side wall 72 so as to prevent any grain, granular materials or the like from passing between the distal edges of the spiral flighting and the internal surface of the side wall 72. When the spiral flighting 28 is disposed within the tube body 16, the longitudinal central axis of the flighting 28 is coaxial with the central longitudinal axis of the side wall 72.

An elongated aperture 74 is formed in the upwardly facing arc portion of the side wall 72 and extends from one end of the tube body 16 to the other. The lateral or side edges 76 of the aperture 74 are parallel to the longitudinal central axis of the side wall 72, and the angle defined by these lateral edges 76 and the central longitudinal axis of the side wall 72 is bisected by a vertical plane which includes the central longitudinal axis of the side wall 72.

First and second vertically disposed, parallel ribs 78 and 80 are formed along the lateral edges 76 of the aperture 74 as an integral extension of the side wall 72. The ribs 78 and 80 project outwardly from the plane of the side wall 72 adjacent to the aperture 74, and like the aperture 74, extend from one end of the tube body 16 to the other. As noted above, the tube body 26 is longitudinally strengthened and stiffened by these ribs 78 and 80.

A cap 82 fits over and covers the aperture 74 so as to prevent the grain, granular material and the like being conveyed through the tube body 16 from spilling out or escaping from the interior of the tube body 16 through the aperture 74. The cap 82 extends from one end of the tube body 16 to the other and comprises a central, elongated generally flat member 84 which overlies the aperture 74. Vertically disposed, parallel ribs 86 and 88 are integrally formed along the lateral or side edges of the central member 84 and project inwardly toward the side wall 72. The transverse dimension of the central member 84 is selected so that the ribs 86 and 88 are disposed adjacent to and in surface to surface contact with the outwardly facing surfaces of the ribs 78 and 80, respectively. The cap 62 may be secured to the tube body 16. The ribs 86 and 88 provide additional longitudinal strengthening and stiffening for the tube body 16 and together with the ribs 78 and 80, provide a strong open, box-shaped "backbone" for the tube body 16.

As noted above, one of the primary advantages of the unique configuration and structure of the tube bodies 14, 16 and 18 is that the ribs 78, 80, 86 and 88 provide sufficient rigidity and stiffness for the auger tube 12 that external bracing and top-trussing can be eliminated even when the length of the tube 12 exceeds 63 feet. However, the unique configuration and structure of the tube bodies also affords additional advantages in that it provides extra cross-sectional area for the movement of grain, granular materials and the like. For example, a conventional eight inch diameter cylindrical auger tube would have a 50.266 square inches of area for material movement. However, when the side wall 72 has an eight inch diameter, the total cross-sectional area of the tube body 16 is 52.746 square inches. Thus, the tube body 16 has an approximately 5% greater cross-sectional area than a conventional auger tube. In fact, the use of the tube body 16, having an eight inch diameter side wall 72, is equivalent in cross-sectional area to using a conventional, cylindrical auger tube having 8.53 inch diameter.

Another important advantage of the structure and configuration of the tube body 16 is that it tends to eliminate the "bunching up" of materials within the tube body and affords, in effect, a "safety valve" whenever there is some "bunching up" within the tube body 16. Moreover, the inclusion of the aperture 74 in the side wall 72 reduces the friction exerted by the wall 72 on the materials being conveyed through the auger tube 12. This reduction prevents or reduces grain breakage and cracking and, of course, requires less power in order to convey materials.

A further important advantage, from a customer appeal standpoint, is that accessory units can be more easily mounted on the auger tube 12 since they can be mounted directly on the central member 84. This eliminates the use of cumbersome brackets which were heretofore needed to properly mount accessories on the conventional round or cylindrical auger tubes.

Still another advantage of the unique configuration and structure of the tube body 16 is that access to the interior of the tube body can be obtained without destroying the contour of the body 16. In the past, it was necessary to gain access to the interior of a conventional cylindrical auger tube by cutting through a part of the tube wall and the portions of the tube adjacent to part being cut away were sometimes distorted. This made patching the tube difficult. With the tube body 16, access to the interior of the body can be had through the central member 84 without any danger of distorting the contour of the side wall 72.

As noted above, the tube bodies 14, 16 and 18 are secured together, in correct end to end alignment, by the tube clamps 20 and 22. These tube clamps 20 and 22 are structurally and functionally identical and for this reason, only clamp 22 is described hereinafter in detail.

Referring now to FIGS. 2, 4, 5 and 6, the tube clamp 22 fits around the upper end 90 of the middle tube body 16 and the lower end 92 of the upper tube body 18. The clamp 22 includes an upper member 94 and a lower member 96. The upper member 94 has a cross-sectional shape or configuration which is congruent to and substantially dimensionally identical to the upper half of the tube bodies 16 and 18. Flanges 98 and 100 are formed along the lateral edges of the upper member 94 and project radially outwardly therefrom, with respect to the central longitudinal axis of the tube bodies. The lower member 96 has a cross-sectional shape or configuration which is congruent to and substantially dimensionally identical to the lower half of the tube bodies 16 and 18. Like upper member 94, the member 96 also has flanges 102 and 104 which are formed along its lateral edges and which project radially outwardly therefrom, with respect to the longitudinal central axis of the tube bodies. The members 94 and 96 are constructed so that they fit snugly about the ends 90 and 92 of the tube bodies 16 and 18 and so that when the members 94 and 96 are so disposed about the ends 90 and 92, the flanges 98 and 102 and the flanges 100 and 104 are positioned adjacent to each other. A plurality of bolts 106 are used to secure the flanges 98 and 102 and the flanges 100 and 104 together.

A pair of reinforced angles 108 and 110 are secured to the outside facing surface of the upper flat top portion 112 of the upper member 94. As best shown in FIGS. 5 and 6, these angles 108 and 110 are arranged and positioned so that their vertically disposed, surfaces are adjacent to and coplaner with the upper and lower ends, respectively, of the upper member 94. The angles 108 and 110 cooperate with reinforced angles 114 and 116, respectively, which are mounted on the central members 84 of the tube bodies 16 and 18. The angles 114 and 116 are positioned and arranged on the members 84 so that their vertically disposed surfaces are adjacent to the angles 108 and 110, respectively. A plurality of bolts 118 are used to secure the adjacent angles 108 and 114 and angles 110 and 116 together. The arrangement of these angles provides additional support for the auger tube 12.

An auger elevator embodying the principles of my present invention has been constructed and has proved to function in a highly satisfactory manner. In this auger elevator, the internal diameter of the side walls 72 was 8.0 inches, and the side walls 72 were made from fourteen gauge (0.074 inches) hot rolled steel. The angle defined by the lateral edges 76 of the aperture 74 and the central longitudinal axis of the side wall 72 was 60°. The vertical height of the ribs 78 and 80 was 1.0 inches while the height of the ribs 86 and 88 was 0.75 inches. The central member 84 of the cap 82 had a width of 4.156 inches and the inside facing surfaces of the ribs 78 and 80 were spaced 2.0 inches from a vertical plane including the longitudinal center line of the side wall 72.

In view of the foregoing, it should be apparent to those having skill in this art that the auger elevator 10 of the present invention represents a significant improvement and advance in this art. Not only does the use of the novel auger tube 12 permit the elimination of cumbersome, expensive external bracing and top-trussing, but in addition, provides a number of other commercially important advantages.

It should also be obvious to persons having skill in this art that modifications or changes could be made in the structure of the auger elevator described hereinabove. In other words, the auger elevator 10 disclosed herein may be embodied in other specific forms without departing from the spirit or central characteristics of my invention. Thus the preferred embodiment of my auger elevator described herein is therefore to be considered in all respects as illustrative and not restrictive, the scope of my invention being indicated by the appended claims, rather than by the foregoing description, and all changes which come within the meaning and range of equivalency of the claims are therefore intended to be embraced therein.

I claim:

1. An improved auger elevator adapted for conveying grain, granular materials and the like up relatively steep, lengthy inclines, the improved auger elevator comprising:
   auger tube means including at least first and second elongated tube bodies, with each of the tube bodies having a first end and a second end and with each of the tube bodies including: a side wall extending from its first end to its second end and defining therein a longitudinal flow path for conveying grain, granular materials and the like from its first end to its second end; an elongated aperture formed in a portion of the side wall, the elongated aperture having first and second lateral edges and extending substantially from the first end of the tube body to its second end; rib means disposed adjacent to at least one of the first and second lateral edges of the elongated aperture for longitudinally strengthening the tube body; cap means overlying the elongated aperture and being spaced from the plane of the portions of the side wall adjacent to the elongated aperture for preventing the grain, granular materials and the like, being conveyed along the longitudinal flow path, from spilling out of the tube body through the elongated aperture;
   tube clamp means for connecting the second end of the first tube body to the first end of the second tube body, the tube clamp means including: a first member having a first central portion that is congruent, in cross-sectional shape, to the shape of the lower facing portion of the side wall and having first and second flanges formed on and along the lateral edges of the first central portion; and a second member having a second central portion that is congruent, in cross-sectional shape, to the cap means and the portions of the side wall adjacent to the cap means and having third and fourth flanges formed on and along the lateral edges of the second central portion; the first and second members being disposed about the adjacent end of the second tube body and second end of the first tube body so that the first and third flanges and the second and fourth flanges, respectively, are adjacent to each other; securing means for securing the first and third flanges together and the second and fourth flanges together so that the adjacent ends of the first and second tube bodies are clamped between the first and second members;
   means, disposed at least in part within the auger tube means, for conveying grain, granular materials and the like from the first end of the first tube body to the second end of the second tube body along the longitudinal flow path;
   hopper means disposed adjacent to the first end of the first tube body for introducing the grain, granular materials and the like to the end of the conveying means disposed adjacent to the first end of the first tube body; and
   undercarriage means connected with the auger tube means for supporting the auger tube means at an angle with respect to the ground so that the first end of the first tube body is disposed closer to the ground than the second end of the second tube body, the undercarriage means including means for selectively raising and lowering the second end of the second tube body with respect to the ground.

2. The improved auger elevator described in claim 1 wherein additional means are mounted on the outwardly facing surface of the cap means and on the second member of the tube clamp means for reinforcing the interconnection between the first and second tube bodies.

3. The improved auger elevator described in claim 1 wherein in each of the first and second tube bodies, the rib means includes first and second parallel, vertically disposed ribs on and along the tube body and adjacent to the first and second lateral edges, respectively, of the elongated aperture, the first and second ribs extending from one end of the tube body to its other end and projecting outwardly, with respect to the longitudinal axis of the elongated body, from the plane of the adjacent portions of the side wall; and wherein in each of the first and second tube bodies, the cap means includes a generally "U" shaped, in cross-section, cap having an elongated central portion which overlies the elongated aperture and having third and fourth parallel, vertically disposed ribs which are on the lateral edges of the central portion and which are disposed adjacent to the first and second ribs, respectively.

4. The improved auger elevator described in claim 3 wherein in each of the first and second tube bodies, the first and second lateral edges of the elongated aperture and the longitudinal central axis of the tube body define an angle of substantially 60°; and wherein a vertical plane, including said longitudinal central axis, bisects said angle.

5. The improved auger elevator described in claim 4 wherein additional means are mounted on the outwardly facing surface of the cap means and the second member of the tube clamp means for reinforcing the interconnection between the first and second tube bodies.

6. The improved auger elevator described in claim 5 wherein the auger tube means includes at least one additional tube body that is substantially identical to the first and second tube bodies; wherein the tube bodies are positioned in an end to end abutting relationship, so that their central longitudinal axes are substantially aligned; and wherein tube clamp means are utilized to connect the adjacent, abutting ends of the adjacent tube bodies.

7. An improved auger elevator for conveying grains, granular materials and the like up the relatively steep, lengthy inclines that are encountered during normal usage of the auger elevators, the improved auger elevator comprising:

auger tube means having a generally cylindrical side wall which defines an arc, in a plane transverse to its longitudinal axis, of greater than 180°, which extends from one end of the auger tube means to its other end, and whose inner surface defines a longitudinal flow path for the grains, granular materials and the like being conveyed;

undercarriage means, connected with the auger tube means at at least one point that is disposed between the ends of the auger tube means, for supporting the auger tube means so that the longitudinal axis of the auger tube means is disposed at an angle with respect to the ground and so that one end of the auger tube means is disposed closer to the ground than the other end of the auger tube means;

means for reinforcing and strengthening the auger tube body against bending in a vertical plane, that includes the longitudinal axis of the auger tube means, when the auger tube means is disposed for conveying grains, granular materials and the like up the relatively steep, lengthy inclines that are encountered during normal usage so as to permit the auger elevator to convey the grains, granular materials and the like up lengthier inclines, without top-trussing, than heretofore possible, the reinforcing and strengthening means including: first and second spaced, parallel, vertically disposed, continuous ribs which are integral with the outer surface of the vertically upwardly facing portion of the side wall of the auger tube body, which extends along the outer surface of the vertically upwardly facing portion of the side wall of the auger tube means from the one end of the auger tube means to the other end, which project outwardly, vertically, from the generally cylindrical plane of the side wall of the auger tube means, with respect to the longitudinal axis of the auger tube means, and which define therebetween an elongated aperture, the elongated aperture extending from one end of the auger tube means to the other end and having a circumferential width extending from the first rib to the second rib and being sufficiently small so as not to impair the conveyance of grains, granular materials and the like through the auger tube means even when the auger tube means is disposed at a relatively steep angle with respect to the ground, with the longitudinal side edges of the elongated aperture and the longitudinal axis of the auger tube means defining an angle of substantially 60° and with the longitudinal side edges being disposed so that a vertical plane, including the longitudinal axis of the auger tube means bisects said angle; and cap means, mounted on the first and second ribs and overlying the elongated aperture, for preventing the grains, granular materials and the like being conveyed along the longitudinal flow path from spilling out of the auger tube means through the elongated aperture, the cap means including a generally "U" shaped, in cross-section, cap member having an elongated central portion which overlies the elongated aperture;

spiral flighting disposed at least in part within the auger tube means and having a diameter substantially equal to the diameter of the cylindrical side wall of the auger tube means, the spiral flighting including means for rotating it about its longitudinal axis for conveying grains, granular materials and the like from one end of the auger tube means to its other end along the longitudinal flow path; and hopper means disposed adjacent to the one end of the auger tube means for introducing the grains, granular materials and the like to the one end of the auger tube means.

8. The improved auger elevator described in claim 7 wherein the cap member includes third and fourth elongated parallel, vertically disposed ribs which constitute the lateral edges of the cap member, which are disposed adjacent to and are secured to the first and second ribs, respectively, and which constitute a portion of the reinforcing and strengthening means.

9. The improved auger elevator described in claim 7 wherein the auger tube means includes at least two, substantially identical elongated tube bodies, with the one end of the one tube body being disposed adjacent to the hopper means and with the one end of the other tube body being disposed adjacent to the other end of the one tube body; and wherein tube clamp means are utilized to connect one tube body to the other tube body.

* * * * *